US012521166B2

(12) United States Patent
Mao

(10) Patent No.: US 12,521,166 B2
(45) Date of Patent: Jan. 13, 2026

(54) ELECTROSURGICAL PENCIL WITH BLOWING AND SUCTION

(71) Applicant: Covidien LP, Mansfield, MA (US)

(72) Inventor: Jianguo Mao, Shanghai (CN)

(73) Assignee: Covidien LP, Mansfield, MA (US)

( * ) Notice: Subject to any disclaimer, the term of this patent is extended or adjusted under 35 U.S.C. 154(b) by 521 days.

(21) Appl. No.: 18/008,478

(22) PCT Filed: Jun. 15, 2020

(86) PCT No.: PCT/CN2020/096190
§ 371 (c)(1),
(2) Date: Dec. 6, 2022

(87) PCT Pub. No.: WO2021/253184
PCT Pub. Date: Dec. 23, 2021

(65) Prior Publication Data
US 2023/0200885 A1    Jun. 29, 2023

(51) Int. Cl.
*A61B 18/14* (2006.01)
*A61B 18/00* (2006.01)
(52) U.S. Cl.
CPC ..... *A61B 18/1402* (2013.01); *A61B 2018/00166* (2013.01); *A61B 2018/0091* (2013.01);
(Continued)
(58) Field of Classification Search
CPC ........... A61B 2018/00166; A61B 2018/00196; A61B 2018/00589; A61B 2018/00601;
(Continued)

(56) References Cited

U.S. PATENT DOCUMENTS 5,300,069 A * 4/1994 Hunsberger ....... A61B 18/1482
606/49
2005/0113825 A1 5/2005 Cosmescu
(Continued)

FOREIGN PATENT DOCUMENTS

CN 1929794 A 3/2007
CN 104644261 A 5/2015
(Continued)

OTHER PUBLICATIONS

Extended European Search Report issued in corresponding application EP 20940577.8 (28 pages).
(Continued)

*Primary Examiner* — Linda C Dvorak
*Assistant Examiner* — Bradford C. Blaise
(74) *Attorney, Agent, or Firm* — Carter, DeLuca & Farrell, LLP

(57) ABSTRACT

An electrosurgical pencil (10) includes a handle (14), a manifold (15) disposed within the handle (14), a suction tube (18) and a blower tube (16) operably coupled to the manifold (15), and an electrode assembly (20) removably coupled to the manifold (15). The suction tube (18) is configured to evacuate fluid from a surgical site and the blower tube (16) is configured to deliver fluid to a surgical site. The electrode assembly (20) includes an outer tubular member (28), an inner tubular member (26), and an electrode (25). The outer tubular member (28) defines at least one suction aperture (28A) and a suction lumen (28L) in fluid communication with the suction tube (18). The inner tubular member (26) is disposed within the suction lumen (28L) of the outer tubular member (28) and defines at least one blower aperture (26A) and blower lumen (26L) in fluid communication with the blower tube (16). The electrode (25) is configured to deliver electrosurgical energy to tissue.

20 Claims, 5 Drawing Sheets

(52) U.S. Cl.
CPC . *A61B 2018/1475* (2013.01); *A61B 2218/005* (2013.01); *A61B 2218/006* (2013.01); *A61B 2218/008* (2013.01)

(58) Field of Classification Search
CPC .. A61B 2018/00607; A61B 2018/0091; A61B 2018/1422; A61B 2018/1475; A61B 18/1402; A61B 2218/005; A61B 2218/006; A61B 2218/008
See application file for complete search history.

(56) References Cited

U.S. PATENT DOCUMENTS

| | | |
|---|---|---|
| 2006/0025792 A1* | 2/2006 | Gibson ............. A61B 17/2909 606/170 |
| 2006/0235377 A1 | 10/2006 | Earley et al. |
| 2006/0241580 A1 | 10/2006 | Mittelstein et al. |
| 2006/0276783 A1 | 12/2006 | Cosmescu |
| 2007/0213709 A1 | 9/2007 | Podhajsky |
| 2007/0265615 A1 | 11/2007 | Ben-Simhon |
| 2008/0058801 A1 | 3/2008 | Taylor et al. |
| 2013/0237982 A1 | 9/2013 | Rencher et al. |
| 2016/0106589 A1 | 4/2016 | Mittelstein et al. |
| 2017/0105789 A1 | 4/2017 | Boudreaux et al. |
| 2017/0360499 A1* | 12/2017 | Greep ................ A61B 18/1402 |

FOREIGN PATENT DOCUMENTS

| | | |
|---|---|---|
| CN | 105125282 A | 12/2015 |
| CN | 106691582 A | 5/2017 |
| CN | 207912768 U | 9/2018 |
| CN | 110636809 A | 12/2019 |
| CN | 110934637 A | 3/2020 |
| EP | 2105103 A1 | 9/2009 |
| WO | 2012106543 A1 | 8/2012 |

OTHER PUBLICATIONS

International Search Report and Written Opinion dated Mar. 11, 2021, issued in corresponding international application No. PCT/CN2020/096190, 7 pages.

* cited by examiner

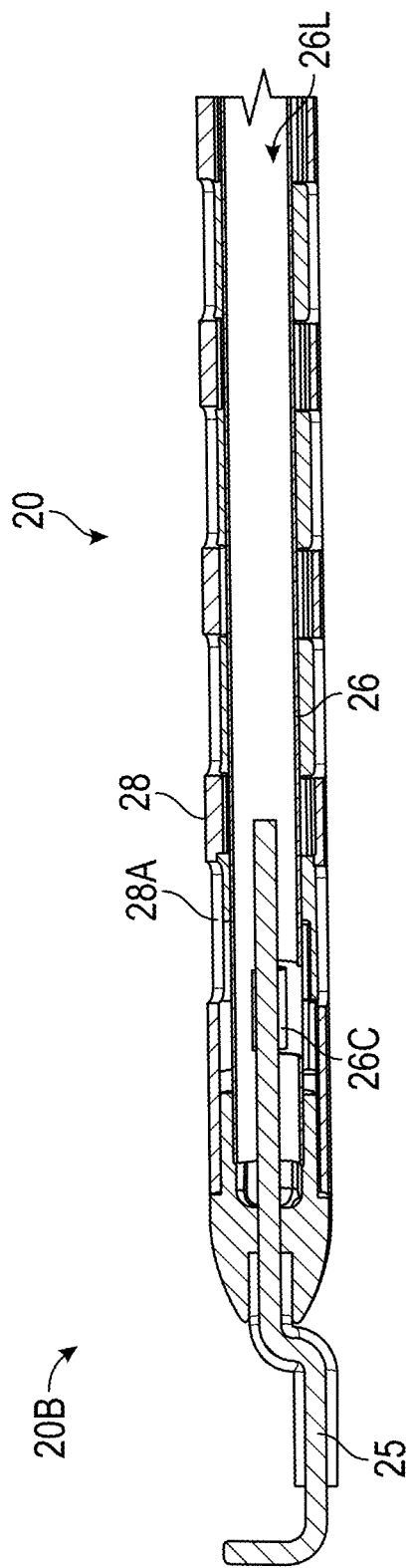
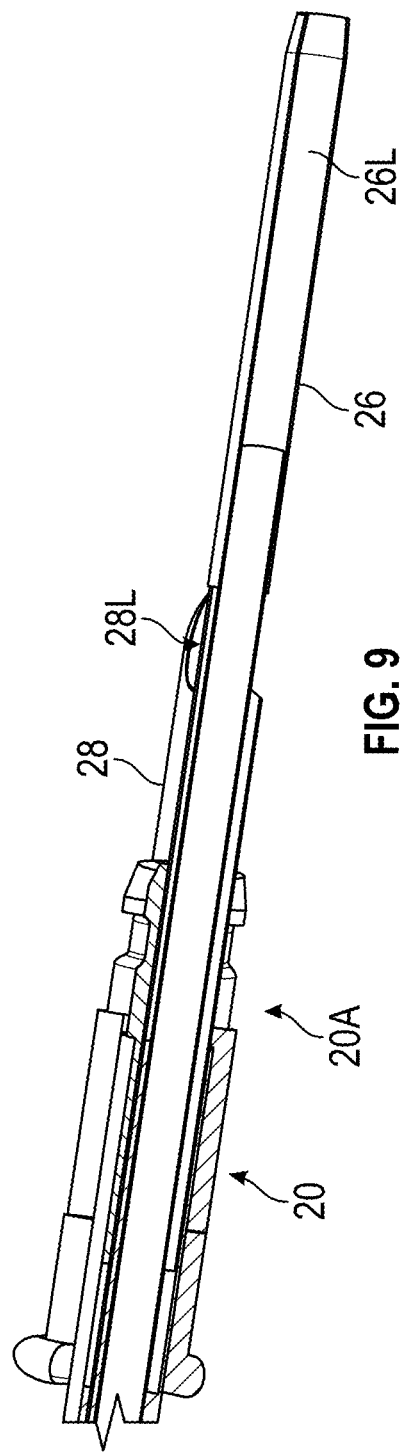
FIG. 8
FIG. 9

ELECTROSURGICAL PENCIL WITH BLOWING AND SUCTION

FIELD

This disclosure is generally related to surgical devices and, more particularly, to an electrosurgical pencil for providing suction and blowing during surgery.

BACKGROUND

Electrosurgical (ES) pencils are used in surgery, typically for cutting tissue and/or for coagulating blood vessels. An ES pencil usually includes a handpiece into which electrodes of various shapes and sizes may be placed. The electrode is supplied with a high frequency, typically radio frequency (RF) alternating current provided by an ES generator, such as Medtronic's Valleylab™ LS10 or FT10 Generators. The ES generator may supply various waveforms suitable for achieving various surgical effects, such as cutting, coagulating, blend, spray, fulgurate, and the like.

While using an ES pencil, smoke is often generated. An effective way to evacuate surgical smoke is to use an ES pencil with an integrated smoke evacuation nozzle in conjunction with a suction device and an ultra-low penetration air (ULPA) filter. Conventional ES pencils rely on smoke evacuation shrouds attached to the ES pencil, which suction the smoke away via a suction device. Smoke shrouds are available either as an integrated part of the ES pencil or as a separate shroud attached to the ES pencil. A smoke nozzle, situated near the pencil's electrode, draws the smoke plume into and through the pencil's body, through a long flexible hose, and finally into a powered suction device outside of the surgical field.

SUMMARY

This disclosure is directed to a surgical instrument, and a system including a surgical instrument having an electrode and suction and blowing lumens.

In accordance with aspects of the disclosure, an electrosurgical pencil includes a handle, a manifold disposed within the handle, a suction tube and a blower tube operably coupled to the manifold, and an electrode assembly removably coupled to the manifold. The suction tube is configured to evacuate fluid from a surgical site and the blower tube is configured to deliver fluid to a surgical site. The electrode assembly includes an outer tubular member, an inner tubular member, and an electrode. The outer tubular member defines at least one suction aperture and a suction lumen in fluid communication with the suction tube. The inner tubular member is disposed within the suction lumen of the outer tubular member and defines at least one blower aperture and blower lumen in fluid communication with the blower tube. The electrode is configured to deliver electrosurgical energy to tissue.

In an aspect, the inner tubular member is conductive and electrically coupled to the electrode to deliver electrosurgical energy to the electrode.

In an aspect, the electrosurgical pencil further includes a power cable extending through at least one of the blower tube or the suction tube and configured to operably couple the electrode to an electrosurgical generator.

In an aspect, the blower tube is configured to couple to a source of carbon dioxide gas for delivery of the carbon dioxide gas to a surgical site and the suction tube is configured to couple to a smoke evacuation system for removal of surgical smoke from a surgical site.

The electrode may be a hook-shaped electrode or a shovel-shaped electrode.

In an aspect, the at least one suction aperture is proximal to the at least one blower aperture.

In an aspect, the electrosurgical pencil further includes an extension tube surrounding at least a portion of the electrode and in fluid communication with the blower lumen of the inner tubular member.

In an aspect, a distal portion of the inner tubular member includes a clip configured to secure the electrode to the inner tubular member.

In another aspect of the disclosure, a surgical system includes an electrosurgical generator configured to generate electrosurgical energy, a smoke evacuation system, a fluid source, and an electrosurgical pencil configured to operably couple to the electrosurgical generator, the fluid source, and the smoke evacuation system. The electrosurgical pencil includes a handle, a manifold disposed within the handle, a suction tube and a blower tube operably coupled to the manifold, and an electrode assembly removably coupled to the manifold. The suction tube is configured to couple to the smoke evacuation system to evacuate fluid from a surgical site and the blower tube is configured to couple to the fluid source to deliver fluid to a surgical site. The electrode assembly includes an outer tubular member, and inner tubular member, and an electrode. The outer tubular member defines at least one suction aperture and a suction lumen in fluid communication with the suction tube. The inner tubular member is disposed within the suction lumen of the outer tubular member and defines at least one blower aperture and blower lumen in fluid communication with the blower tube. The electrode is configured to deliver electrosurgical energy to tissue.

In an aspect, the inner tubular member is conductive and electrically coupled to the electrode to deliver electrosurgical energy to the electrode.

In an aspect, the electrosurgical pencil further includes a power cable extending through at least one of the blower tube or the suction tube and configured to operably couple the electrode to the electrosurgical generator.

The electrode may be a hook-shaped electrode or a shovel-shaped electrode.

In an aspect, the at least one suction aperture is proximal to the at least one blower aperture.

In an aspect, the electrode assembly of the electrosurgical pencil further includes an extension tube surrounding at least a portion of the electrode and in fluid communication with the blower lumen of the inner tubular member.

In an aspect, a distal portion of the inner tubular member includes a clip configured to secure the electrode to the inner tubular member.

In another aspect of the disclosure, an electrosurgical pencil includes a handle, a manifold disposed within the handle, a suction tube and a blower tube operably coupled to the manifold, and an electrode assembly removably coupled to the manifold. The suction tube is configured to couple to the smoke evacuation system to evacuate fluid from a surgical site and the blower tube is configured to couple to the fluid source to deliver fluid to a surgical site. The electrode assembly includes an outer tubular member, and inner tubular member, and an electrode. The outer tubular member defines at least one suction aperture and a suction lumen in fluid communication with the suction tube. The inner tubular member is disposed within the suction lumen of the outer tubular member and defines at least one blower aperture and blower lumen in fluid communication with the blower tube. The electrode is electrically coupled to the inner tubular member and configured to deliver electrosurgical energy to tissue.

In an aspect, an extension tube surrounds at least a portion of the electrode and is in fluid communication with the blower lumen of the inner tubular member.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

Various aspects of the disclosure are described herein below with reference to the drawings, wherein:

FIG. 8 is a side, cross-sectional, view of a distal portion of the electrode assembly of FIG. 4; and FIG. 9 is a side, cross-sectional, view of a proximal portion of the electrode assembly of FIG. 4.

DETAILED DESCRIPTION

In this description, the term "proximal" is used generally to refer to that portion of the device that is closer to a clinician, while the term "distal" is used generally to refer to that portion of the device that is farther from the clinician. Further, the term "clinician" is used generally to refer to medical personnel including doctors, nurses, and support personnel.

As smoke accumulates in a surgical site from the electrosurgical treatment of tissue, the visualization through the laparoscope or other visualization device gets blurred, obscuring the clinician's view of the surgical site during an operation. Additionally, during the surgical operation, a bleeding point may be difficult to find due to the tissue being covered in blood, making it difficult for a clinician to pin-point where to cauterize the tissue to stop the bleeding.

In order to provide better bleeding point identification and visualization of the surgical site during the procedure, this disclosure provides a surgical system including a surgical instrument that serves to simultaneously provide fluid blowing (e.g., carbon dioxide blowing) and smoke suction at the surgical site. As described below, blowing fluid from a distal end of the instrument disperses blood film away from tissue so as to reveal the bleeding point, and simultaneously provides the function of diluting the surgical smoke present in the surgical site. Concurrently, suctioning smoke from the surgical site is enabled via a dual lumen device. The instrument includes an electrode assembly having an electrode at its distal end that can be sprayed with a fluid (e.g. carbon dioxide) to blow open a bleeding point covered by blood when the electrode is placed near the tissue. At the same time, the electrode or another portion of the disclosed electrode assembly can absorb/suction the smoke, so that the endoscope, laparoscope, or other visualization device has a clear field of vision, reducing the time used to clear the smoke, shortening the operation time, and reducing the risk associated with the clinician inhaling any smoke generated during the procedure.

Figure 1:
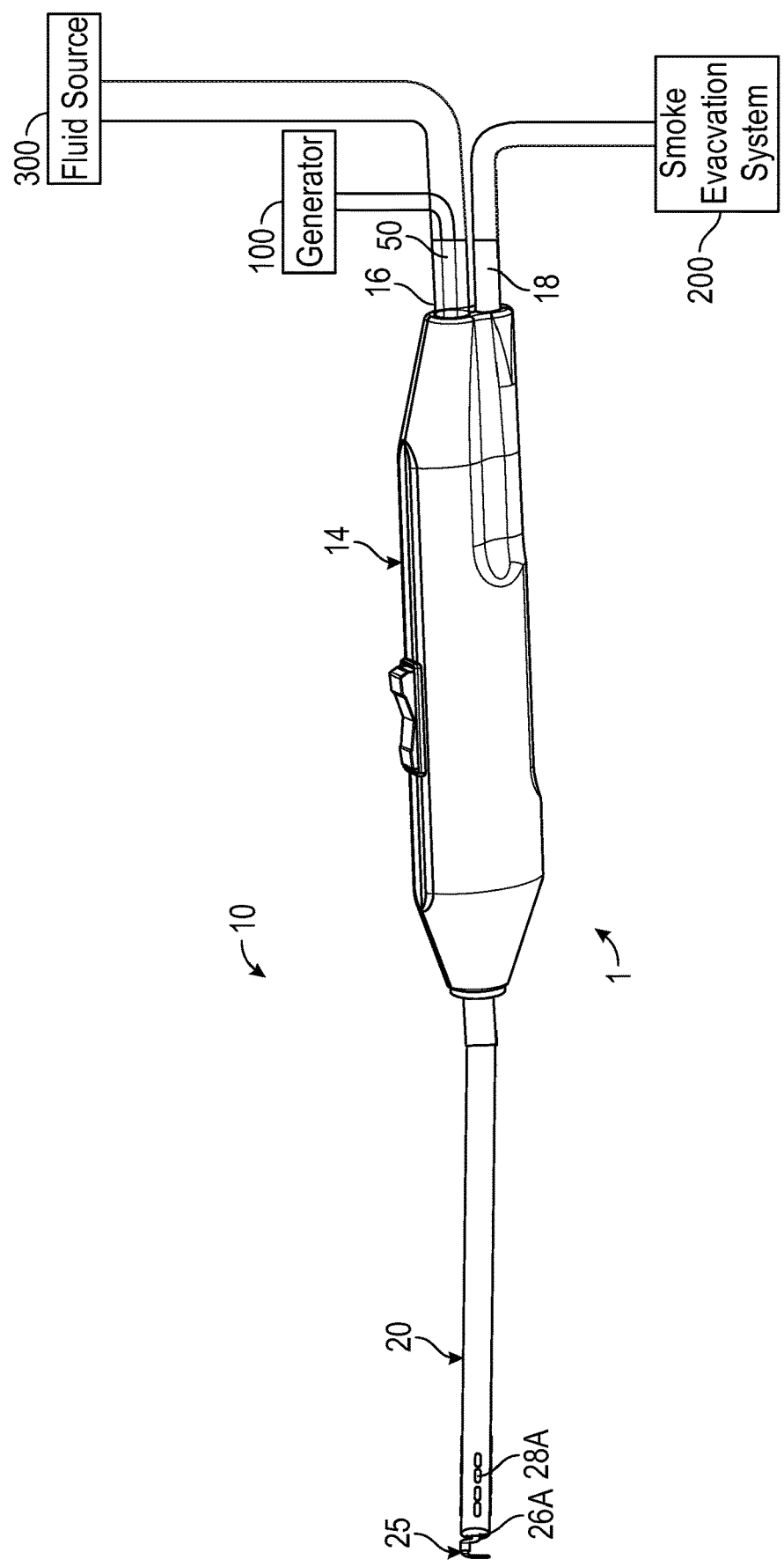
FIG. 1 is a view of a system including an electrosurgical pencil in accordance with the disclosure.
Figure 2:
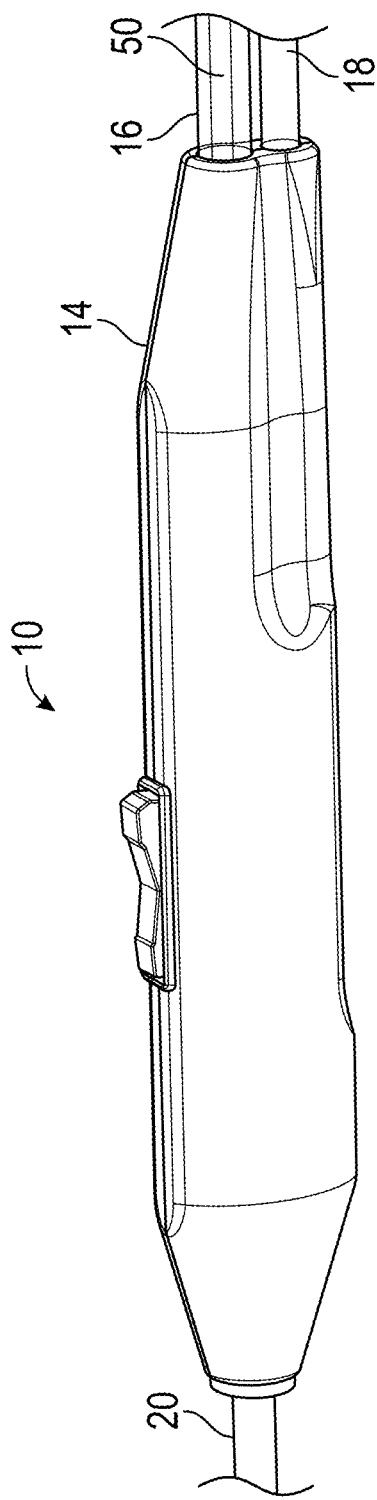
FIG. 2 is a side perspective view of a proximal portion of the electrosurgical pencil of FIG. 1.
Figure 3:
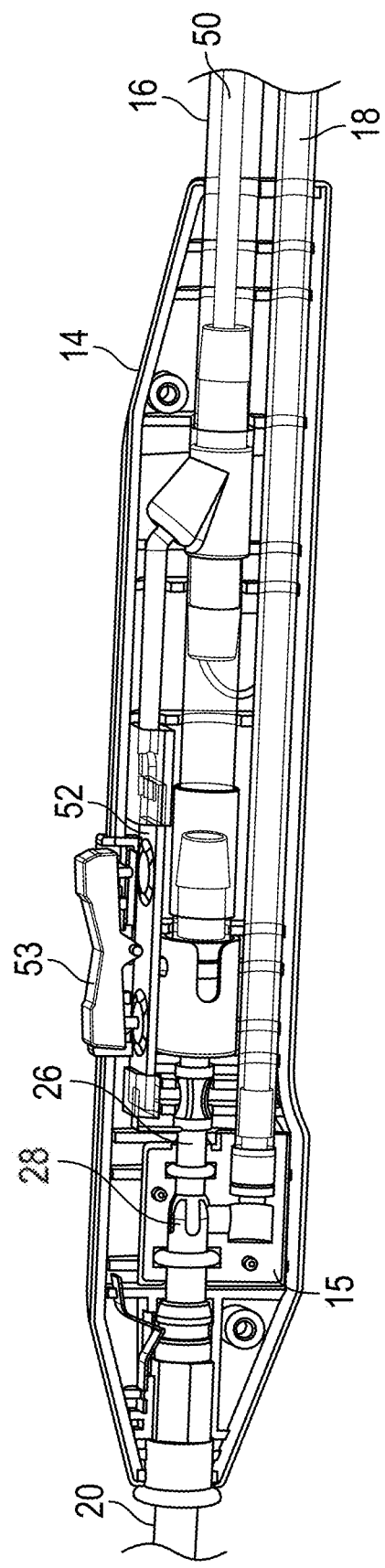
FIG. 3 is a side perspective view of the proximal portion of the electrosurgical pencil of FIG. 1 with parts removed to show internal components of the electrosurgical pencil.
Figure 4:
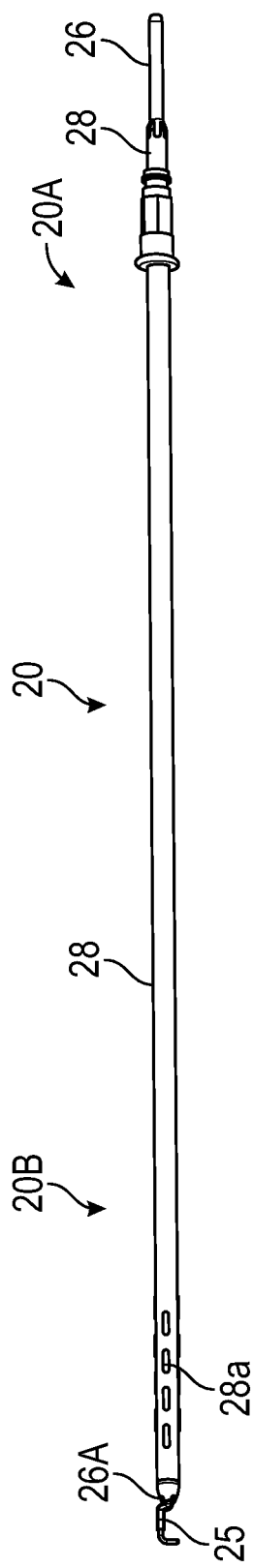
FIG. 4 is a side perspective view of an electrode assembly of the electrosurgical pencil of FIG. 1.
Figure 5:
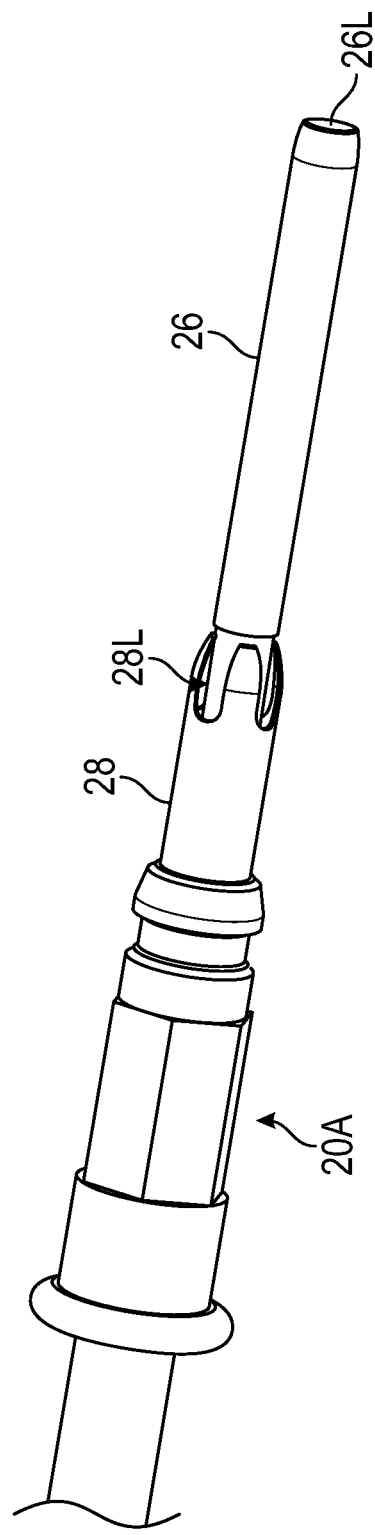
FIG. 5 is a side perspective view of a proximal portion of the electrode assembly of FIG. 4.
Figure 6:
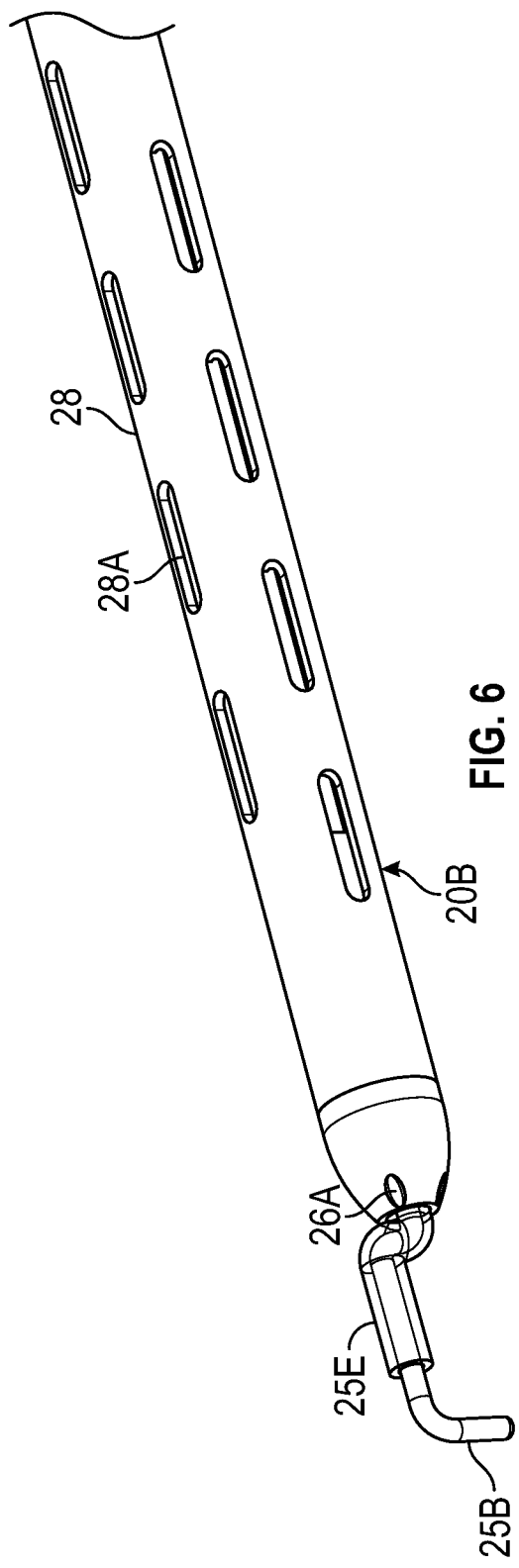
FIG. 6 is a front, side, perspective view of a distal portion of the electrode assembly of FIG. 4 with a hook-shaped electrode.

FIG. 1 illustrates an exemplary surgical system 1 including a surgical generator 100, a smoke evacuation system 200, a fluid source 300, and an electrosurgical pencil 10 that is configured to couple to the electrosurgical generator 100 to deliver electrosurgical energy generated by the electrosurgical generator 100 to tissue. Additionally, the electrosurgical pencil 10 is configured to couple to the smoke evacuation system 200 to evacuate surgical smoke from a surgical site and to the fluid source 300 to introduce fluid into the surgical site.

FIGS. 2-9 illustrate the electrosurgical pencil 10 and its components. Generally, the electrosurgical pencil 10 includes a handle 14, a manifold 15 disposed within the handle 14 and operably coupled to a suction tube 18 and a blower tube 16, and an electrode assembly 20 removably coupled to the manifold 15. A proximal portion 20A of the electrode assembly 20 is configured to releasably couple to the manifold 15 and the electrode 25 extends from a distal portion 20B of the electrode assembly 20. The suction tube 18 defines a lumen configured to evacuate fluid from a surgical site and the blower tube 16 defines a lumen configured to deliver fluid (e.g., carbon dioxide) to a surgical site.

The electrode assembly 20 includes an outer tubular member 28, an inner tubular member 26, and an electrode 25. The outer tubular member 28 defines at least one suction aperture 28A and a suction lumen 28L in fluid communication with the lumen defined by the suction tube 18. The inner tubular member 26 is disposed within the suction lumen 28L of the outer tubular member 28 and defines at least one blower aperture 26A and blower lumen 26L in fluid communication with the lumen defined by the blower tube 16.

Figure 7:
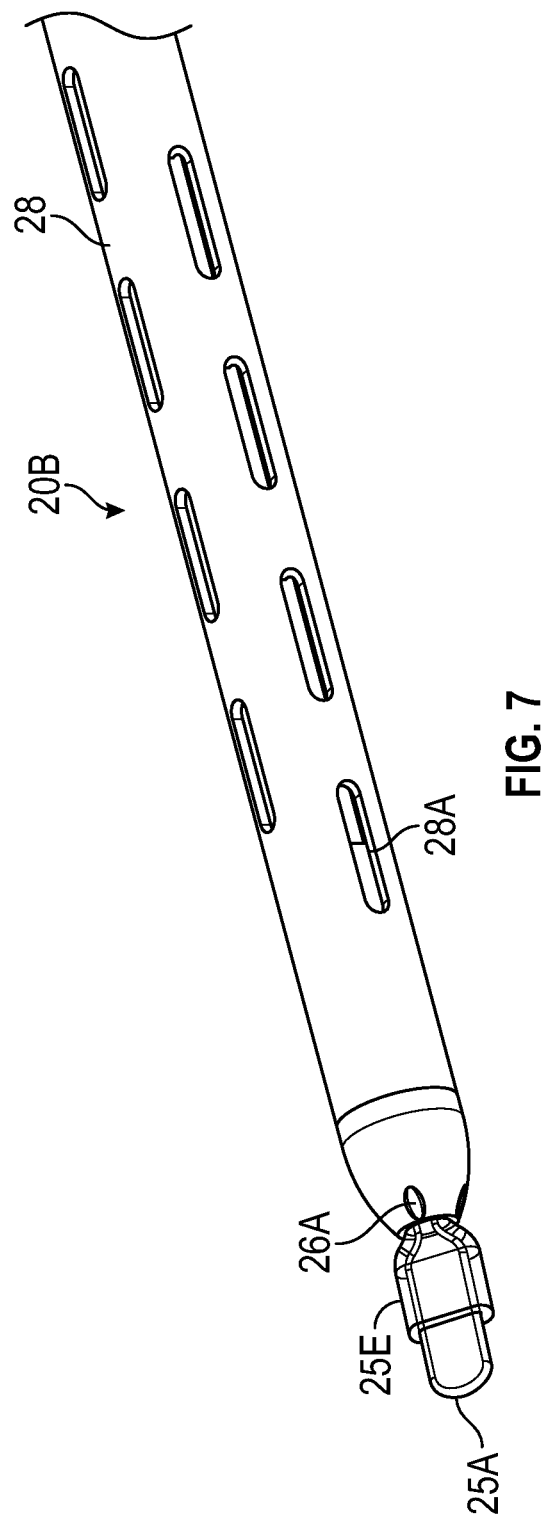
FIG. 7 is a front, side, perspective view of a distal portion of the electrode assembly of FIG. 4 with a shovel-shaped electrode.

The electrode 25 is configured to deliver electrosurgical energy to tissue. The electrode 25 may be any shape suitable for the given surgical procedure, for example, a hook-shaped electrode 25B (FIG. 6) or a shovel-shaped electrode 25A (FIG. 7). Additionally, an extension tube 25E surrounds at least a portion of the electrode 25 and is in fluid communication with the blower lumen 26L of the inner tubular member 26 for delivering fluid from the fluid source 300 (FIG. 1) proximate the electrode 25. With the blower aperture 26A and/or the extension tube 25E positioned proximate the electrode 25, the electrode 25 and the tissue being treated by the electrode 25 can be sprayed with fluid (e.g., carbon dioxide) to blow open the bleeding point or any tissue covered by blood to assist the clinician in identifying the location of the bleeding. Once the bleeding point is identified, a clinician can treat (e.g., cauterize) the tissue at the bleeding point with the electrode 25.

The suction aperture 28A may be a single aperture or a plurality of apertures defined along a length of the outer tubular member 28. Additionally, the one or more suction apertures 28A are positioned proximal to the blower aperture 26A, along a longitudinal length of the electrosurgical pencil 10, so as to not interfere with any fluid delivery through the blower aperture 26A. The simultaneous blowing and suction enables a clinician to clearly view the surgical site with a visualization device such as, e.g., an endoscope.

A power cable 50 (FIG. 1) electrically couples the electrode 25 to the surgical generator 100. For example, the power cable 50 may extend through at least one of the blower tube 16 or the suction tube 18 to gain access to an interior of the handle 14. In one aspect, a distal end of the power cable 50 electrically couples to a circuit board 52 disposed within the handle 14, which is controllable by a switch 53 extending through the handle 14 and manipulatable by a user. Electrically downstream of the switch 53, the circuit board 52 is electrically coupled to the inner tubular member 26. The inner tubular member 26 is conductive and is electrically coupled to the electrode 25. For example, a clip 26C may be formed on an inner surface of the inner tubular member 26 for coupling the electrode 25 to the inner tubular member 26.

Persons skilled in the art will understand that the devices and methods specifically described herein and illustrated in the accompanying drawings are non-limiting exemplary embodiments. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described embodiments. Accordingly, the disclosure is not to be limited by what has been particularly shown and described, except as indicated by the appended claims. Additionally, although shown and described herein in the context of an electrosurgical pencil, one skilled in the art would readily appreciate that the features recited in the claims can readily and easily be adapted to other electrosurgical instruments whose use generates smoke and/or would benefit from introducing fluid into the surgical site.

What is claimed is:

1. An electrosurgical pencil, comprising:
   a handle defining an interior space;
   a manifold disposed within the interior space defined by the handle;
   a suction tube and a blower tube operably coupled to the manifold, the suction tube configured to evacuate fluid from a surgical site and the blower tube configured to deliver fluid to the surgical site; and
   an electrode assembly removably coupled to the manifold, the electrode assembly including:
      an outer tubular member defining at least one suction aperture and a suction lumen in fluid communication with the suction tube;
      an inner tubular member disposed within the suction lumen of the outer tubular member and defining at least one blower aperture and a blower lumen in fluid communication with the blower tube, wherein the outer tubular member and the inner tubular member are directly coupled to the manifold; and
      an electrode configured to deliver electrosurgical energy to tissue.

2. The electrosurgical pencil of claim 1, wherein the inner tubular member is conductive and electrically coupled to the electrode to deliver electrosurgical energy to the electrode.

3. The electrosurgical pencil of claim 1, further comprising a power cable extending through at least one of the blower tube or the suction tube and configured to operably couple the electrode to an electrosurgical generator.

4. The electrosurgical pencil of claim 1, wherein the blower tube is configured to couple to a source of carbon dioxide gas for delivery of the carbon dioxide gas to the surgical site.

5. The electrosurgical pencil of claim 1, wherein the suction tube is configured to couple to a smoke evacuation system for removal of surgical smoke from the surgical site.

6. The electrosurgical pencil of claim 1, wherein the electrode is a hook-shaped electrode.

7. The electrosurgical pencil of claim 1, wherein the electrode is a shovel-shaped electrode.

8. The electrosurgical pencil of claim 1, wherein the at least one suction aperture is disposed through an outer surface of the outer tubular member proximal to the at least one blower aperture and a distal end of the outer tubular member.

9. The electrosurgical pencil of claim 1, further comprising an extension tube surrounding at least a portion of the electrode and in fluid communication with the blower lumen of the inner tubular member.

10. The electrosurgical pencil of claim 1, wherein a distal portion of the inner tubular member includes a clip configured to secure the electrode to the inner tubular member.

11. A surgical system, comprising:
    an electrosurgical generator configured to generate electrosurgical energy;
    a smoke evacuation system;
    a fluid source; and
    an electrosurgical pencil configured to operably couple to the electrosurgical generator, the fluid source, and the smoke evacuation system, the electrosurgical pencil including:
       a handle defining an interior space;
       a manifold disposed within the interior space defined by the handle;
       a suction tube and a blower tube operably coupled to the manifold, the suction tube configured to couple to the smoke evacuation system to evacuate fluid from a surgical site and the blower tube configured to couple to the fluid source to deliver fluid to the surgical site; and
       an electrode assembly removably coupled to the manifold, the electrode assembly including:
          an outer tubular member defining at least one suction aperture and a suction lumen in fluid communication with the suction tube;
          an inner tubular member disposed within the suction lumen of the outer tubular member and defining at least one blower aperture and a blower lumen in fluid communication with the blower tube, wherein the outer tubular member and the inner tubular member are directly coupled to the manifold; and
          an electrode configured to deliver electrosurgical energy to tissue.

12. The surgical system of claim 11, wherein the inner tubular member is conductive and electrically coupled to the electrode to deliver electrosurgical energy to the electrode.

13. The surgical system of claim 11, further comprising a power cable extending through at least one of the blower tube or the suction tube and configured to operably couple the electrode to the electrosurgical generator.

14. The surgical system of claim 11, wherein the electrode is a hook-shaped electrode.

15. The surgical system of claim 11, wherein the electrode is a shovel-shaped electrode.

16. The surgical system of claim 11, wherein the at least one suction aperture is disposed through an outer surface of the outer tubular member proximal to the at least one blower aperture and a distal end of the outer tubular member.

17. The surgical system of claim 11, further comprising an extension tube surrounding at least a portion of the electrode and in fluid communication with the blower lumen of the inner tubular member.

18. The surgical system of claim 11, wherein a distal portion of the inner tubular member includes a clip configured to secure the electrode to the inner tubular member.

19. An electrosurgical pencil, comprising:
a handle defining an interior space;
a manifold disposed within the interior space defined by the handle;
a suction tube and a blower tube operably coupled to the manifold, the suction tube configured to evacuate fluid from a surgical site and the blower tube configured to deliver fluid to the surgical site; and
an electrode assembly removably coupled to the manifold, the electrode assembly including:
an outer tubular member defining at least one suction aperture and a suction lumen in fluid communication with the suction tube;
an inner tubular member disposed within the suction lumen of the outer tubular member and defining at least one blower aperture and a blower lumen in fluid communication with the blower tube, wherein the outer tubular member and the inner tubular member are directly coupled to the manifold; and
an electrode electrically coupled to the inner tubular member and configured to deliver electrosurgical energy to tissue.

20. The electrosurgical pencil of claim 19, further comprising an extension tube surrounding at least a portion of the electrode and in fluid communication with the blower lumen of the inner tubular member.

* * * * *